United States Patent

[11] 3,583,534

| [72] | Inventor | Guy N. Chaumont<br>138 rue Ganlin, Princeville, Quebec, Canada |
|---|---|---|
| [21] | Appl. No. | 818,978 |
| [22] | Filed | Apr. 24, 1969 |
| [45] | Patented | June 8, 1971 |

[54] BRAKE MECHANISM FOR LIGHTWEIGHT VEHICLE
10 Claims, 4 Drawing Figs.

[52] U.S. Cl. .................................................. 192/4,
192/11, 188/77
[51] Int. Cl. ........................................................ F16h 57/10
[50] Field of Search ............................................ 192/4, 11

[56] References Cited
UNITED STATES PATENTS

| 2,481,153 | 9/1949 | Robichaud .................. | 192/4 |
|---|---|---|---|
| 2,891,641 | 6/1959 | Rabe ......................... | 192/4 |
| 3,498,425 | 3/1970 | Takada ....................... | 192/4 |

*Primary Examiner*—Benjamin W. Wyche
*Attorney*—Ward, McElhannon, Brooks & Fitzpatrick

ABSTRACT: The brake mechanism of a lightweight vehicle, such as a snowmobile, is improved by having a brake band frictionally engaging a drum member rigidly secured on the outside wall of the plates of the driven pulley of the clutch mechanism. The support which carries and operates this brake band serves also to adjust the tension in the power-transmitting chain associated with such vehicle.

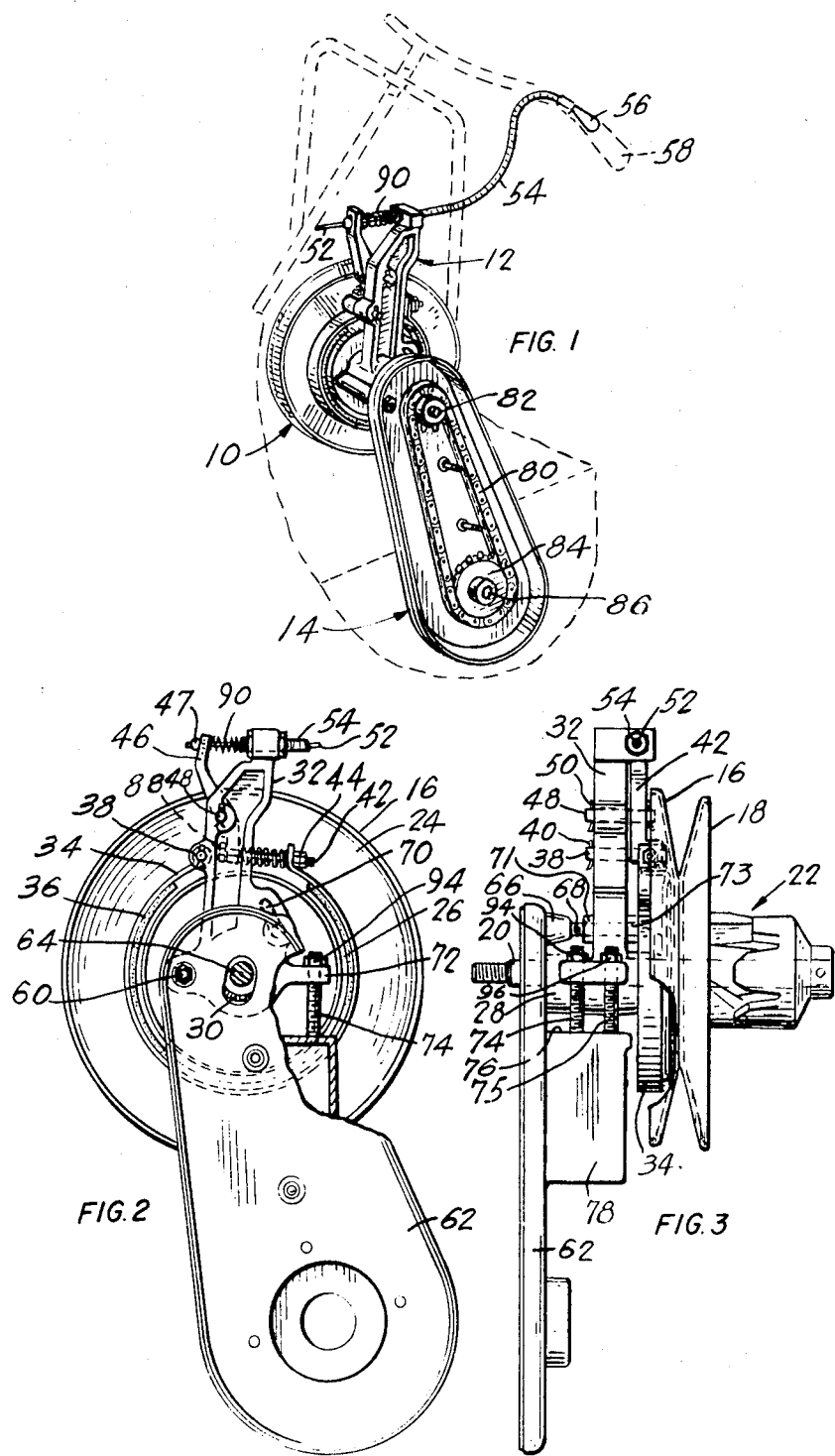

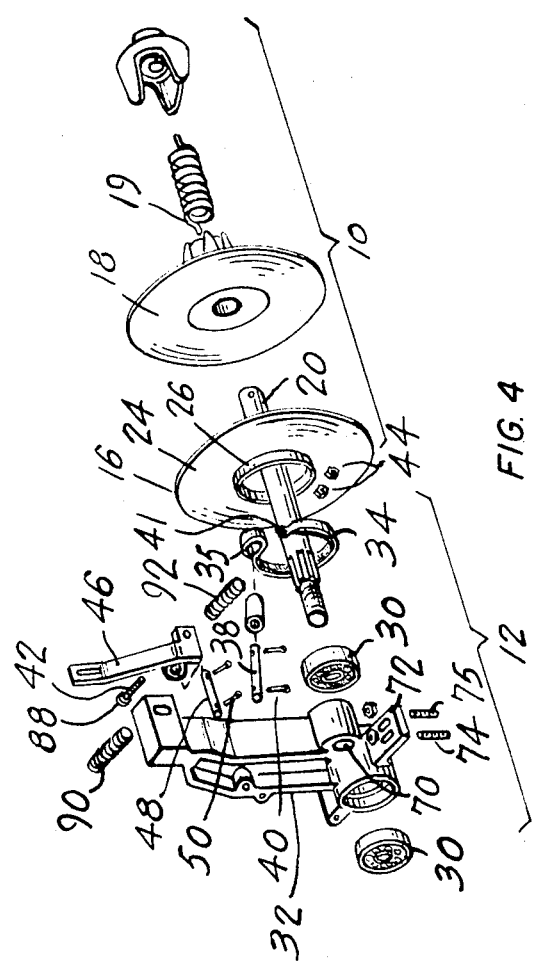

BRAKE MECHANISM FOR LIGHTWEIGHT VEHICLE

This invention relates generally to lightweight vehicles and, more particularly, to improvements in the construction of the brake mechanism used on lightweight vehicles, especially those propelled and stopped by a belt-traction assembly, and to improvements in the chain adjusting mechanism on such vehicles.

Track-propelled vehicles, such as snowmobiles, are usually driven by an internal combustion engine from which power is transmitted via a centrifugal clutch mechanism, consisting of a driving pulley and of a driven pulley, to a sprocket-carrying axle engaging an endless flexible track. The braking mechanism, usually adopted for stopping these vehicles, includes a wire actuated lever arm carrying a small friction surface which is moved against the driven pulley of the clutch to reduce its rotational speed thereby causing the disengagement of the driving belt with the clutch pulleys. However, because the snowmobile is now capable of travelling at relatively high speeds, the momentum of some of the moving parts of its braking mechanism is correspondingly increased; the consequence is that it is more and more difficult to bring the snowmobile to a quick stop. Also, prior braking arrangements, when used on the more recent snowmobiles, are constantly replaced or under repair. Therefore, and because the snowmobile is becoming more and more popular, there has been an increasing demand that snowmobiles be equipped with better braking mechanisms.

The principal object of this invention is to provide an improved brake mechanism for lightweight vehicles, such as snowmobiles, which is unusually simple in construction and highly effective in bringing the vehicle to a stop as sudden as possible. This is accomplished by grouping the clutching elements and the stopping elements in an unique assembly which consists in having a brake band operating directly on a drum member rigidly secured to the outside wall of one of the driven plates of the clutch mechanism. By devising a brake mechanism which will provide a greater area of frictional engagement, it is now possible to bring the snowmobile quickly to a halt. Furthermore, the present brake arrangement enables the brake band to be moved against the drum member in the rotational direction of the drum member thereby causing greater adherence between both parts.

The present invention relates, in its broadest aspect, to a lightweight vehicle where driving motion is provided by means of a small engine-transmitting torque to a belt-traction assembly via a clutch assembly of the centrifugal type, having a driving pulley and a driven pulley cooperating with a driving belt, and where the stopping is caused by the frictional engagement of a brake band with a drum member which is rigidly secured to the outside wall of one of the plates of the driven pulley.

It is also an object of the present invention to provide, adjacent the drum member, a support means, coaxial with the clutch axle, which is adapted to carry the brake band, the brake applying means for frictionally engage the brake band with the drum member and the brake-releasing means for returning the brake assembly to its original rest position.

Another feature of the present invention is the provision on the support means of means for adjusting the tension in the chain which transmits the driving power from the clutch axle to the belt-traction assembly. It frequently happens that, after several uses, the chain becomes loose; this causes slips in the direct engagement of the sprocket teeth with the chain. Furthermore, it is very difficult and bothersome to repair a loose chain in the field; consequently, the driver of the vehicle is encumbered by this defect until he returns to the repair shop. With the present invention, this difficulty is easily overcome by providing, on the brake support means, adjusting means which are easily accessible and rapidly enable the driver to correct on the spot the tension in the loose chain.

A more complete understanding of the invention can be obtained by reference to the accompanying drawings, in which:

FIG. 1, is a perspective view of one embodiment of a brake mechanism according to the present invention for use in a lightweight vehicle, a portion of which is shown in dotted lines;

FIG. 2, is a front elevational view of the device shown in FIG. 1, with the chain and the sprockets being removed;

FIG. 3, is a side elevational view of the device shown in FIG. 2, and

FIG. 4, is an exploded view of the brake mechanism according to the present invention.

Generally, the present invention relates to a brake mechanism for use in a lightweight vehicle, such as a snowmobile, where driving motion is provided to the vehicle by means of small engine of the internal combustion or the like which transmits torque through means of a clutch assembly of the centrifugal type to a chain and sprocket assembly that engages a sprocket-carrying axle that propels an endless flexible belt or track. All of this, however, is well known so that a detailed description thereof and of its operation will not be necessary.

Referring to the drawings, only that which pertains directly to the present invention has been shown and will hereinafter be described. Broadly, there are three main sections relating to the present invention: the driven pulley 10 of the centrifugal clutch, a brake support 12 and a chain assembly 14.

The driven pulley 10 is operatively connected to a driving pulley (not shown) by means of an endless driving V-belt (also not shown) and consists of two rotatable plates, or half-pulleys, 16 and 18 in the form of a disc, tapered or conelike on one side. Plate 16 is journaled or otherwise fixedly mounted on an axle 20 to rotate therewith; plate 18 is also mounted on the axle 20 but is adapted to slide longitudinally thereon through a cam arrangement 22.

Contact between the driving V-belt and the driven plates 16 and 18 is established through friction and maintained through centrifugal force commonly against the action of an helical spring 19 (FIG,4) that breaks the contact when the driving belt slows down.

An annular drum member 26 is integrally or otherwise rigidly fixed on the outside wall 24 of plate 16; the drum member is coaxial with the axle 20. This feature of the present invention offers a friction surface never before provided on lightweight vehicles.

Brake support 12 comprises a cylindrical housing portion 28, coaxially mounted on the axle 20 and adapted by means of roller bearings 30 to allow the free rotational movement of the axle 20 therein; the support 12 also includes an upwardly projecting portion 32, integrally mounted on the housing portion 28.

A brake band 34 having a drum engaging friction lining 36, is carried by portion 32 of the support; one end 35 of the brake band is journaled to the support portion 32 by means of a bolt 38 and two cotter pins 40; the other end 41 of the brake band 34 is secured by means of a bolt 42 and locking nuts 44 to one end of a lever 46. The lever 46 is pivotally mounted on the support portion 32 by means of pin 48 which, in turn, is held in place by two cotter pins 50. The other end of lever 46 fixedly receives by means of a stopper 47 the brake wire 52 running through a flexible covering 54 to the brake lever 56 mounted on the handlebars 58 (shown in dotted lines).

The brake support 12 is pivotally mounted by means of a bolt 60 on the chain case 62 fixed to the frame of the vehicle. An opening 64 in the chain case 62 receives one end of the axle 20. The chain case has, on its backside, a projection 66 having a hole to receive a threaded bolt 68; this bolt extends through slot 70 on support portion 32 and is held in place by nuts 71 and 73. The housing portion 28 of the support 12 has an extended portion 72 having two threaded apertures to receive a couple of threaded bolts 74 and 75 which rest on the top 76 of a back portion 78 integrally or otherwise mounted on the backside of the chain case 62.

The chain case 62 is shaped so as to receive a chain 80 mounted on sprockets 82 and 84. Sprocket 82 is mounted on axle 20 while sprocket 84 transmits angular motion therefrom to a shaft 86 which in turn is adapted to provide driving motion to an endless flexible track mounted underneath the vehicle.

The operation of the brake mechanism will be fairly evident from the above description. When the engine has developed a sufficiently high torque, the V-belt couples the driving pulley to the driven pulley, the axle 20 fixed to the driven pulley transmits angular motion via the chain and sprocket assembly 14 to shaft 86 and the vehicle is driven. In order to operate the brake mechanism, the driver of the vehicle depresses lever 56 on handlebars 58; a pull exerted on wire 52 causes the lever 46 to pivot about pin 48. The lower portion of the lever 46 acts against head 88 of bolt 42, forcing end 41 of brake band 34 toward end 35 thereby bringing the brake lining 36 into frictional engagement with drum member 26. The rotational speed of pulley 10 is thus reduced by this braking operation; spring 19 then causes plate 18 to slide longitudinally on axle 20 in a direction away from plate 16; the driving V-belt which was at the utmost position between plates 16 and 18 when the vehicle was in motion, now begins to lower until it comes to contact axle 20 between the now distanced plates 16 and 18 thereby disconnecting any transmission of torque between the engine and the chain assembly. At the same time, since the drum member 26 is integral with the plate 16 and that the latter is fixedly mounted on the axle 20, any frictional engagement between the brake band and the drum member will cause the axle to stop rotating. Consequently, the rotation of the endless track is stopped.

In referring to FIG. 2 the rotation of plate 16 is counterclockwise, and so is the application of the brake band 34 on the drum member 26; this causes increased adherence between both members and, consequently, better braking action.

Spring 90 is placed on cable 52 between lever 46 and support 32; this spring is compressed during the entire braking operation and its function is to return the lever arm 46 to its original rest position once the brake wire lever 56 is no longer depressed.

Spring 92 which is mounted on bolt 42 between end 41 of the brake band 34 and the lower end of the lever arm 46 is used to ensure that the end 41 constantly bears against one of the bolts 44. The circumferential distance between the brake band and the drum member is obtained by adjusting screws 44 on bolt 42.

Another feature of the present invention is the possibility of adjusting the chain when it becomes loose. In such a case, bolt 60 is loosened along with nuts 71 and 73 on bolt 68; nuts 94 and 96 are also untightened so that bolts 74 and 75 may be turned in their respective holes in extended portion 72. In so adjusting bolts 74 and 75, extension 72 will move away from top surface 76 of back portion 78. Brake support 12 thereby pivots about bolt 60 thus varying the distance between the centers of sprockets 82 and 84. The opening 64 is shaped so as to enable the radial displacement of axle 20 about bolt 60 while slot 70 is similarly shaped to enable the radial displacement of bolt 68. When the desired chain tension is reached, nuts 71 and 73 are tightened on bolt 68, so that bolt 68 be fixedly held in slot 70. Nuts 94 and 96 are also tightened on bolts 74 and 75 respectively and bolt 60 is tightened to fasten the support 12 to the chain case 62.

While the invention has been discussed above only in relation to a specific form of the invention, persons skilled in the art will be aware that it may be refined and modified in various ways without departing from its scope. It is therefore wished to have it understood that this invention is not limited in interpretation except by the terms of the following claims.

What I claim is:

1. In a lightweight vehicle including a rotatable axle, a driven centrifugal clutch pulley having a first plate journaled on the axle and a second plate adapted to slide longitudinally on said axle, and a chain assembly mounted at one end of said axle and adapted to transmit driving motion to the vehicle, a brake mechanism comprising:

a drum member rigidly secured on the outside wall of said first plate, said drum member being coaxial to the axle;

support means having a base portion coaxially mounted on the axle between the drum member and the chain assembly and adapted to allow free rotational movement to the axle therein;

drum-engaging means, having a friction surface for engagement with the drum member, being carried by said support means;

brake-applying means mounted on said support means and acting between the ends of the drum-engaging means for urging the same toward one another to frictionally engage said friction surface with said drum member; and brake-releasing means acting on said brake-applying means for urging the ends of the drum-engaging means away from one another so as to release the friction surface of said drum-engaging means from its engagement with the drum member.

2. A brake mechanism as defined in claim 1 wherein said drum-engaging means consists of a brake band, the inner surface of which carries a friction surface.

3. A brake mechanism as defined in claim 2 wherein said brake-applying means consist of a lever arm pivotably mounted on said support means and force-transmitting means secured at each end of said lever arm for moving said brake band from rest position into frictional engagement with the drum member.

4. A brake mechanism as defined in claim 3 wherein the force-transmitting means at one end of said lever arm connects said one end of said lever arm to one end of said brake band and wherein the force-transmitting means at the other end of said lever arm connects said other end of said lever arm to a brake wire operable when actuated by the driver of the vehicle.

5. A brake mechanism as defined in claim 4 wherein said brake-releasing means consists of a spring coaxially mounted on said brake wire and urging said other end of said lever arm to return to its original rest position.

6. A brake mechanism as defined in claim 1 wherein said chain assembly includes a case rigidly secured to the chassis of said vehicle and having an aperture therein receiving said axle, a chain and a pair of chain-receiving sprockets positioned in said case, one of said sprockets be fixed on said axle, and further comprising means for relatively positioning said support means on said chain case.

7. A brake mechanism as defined in claim 6 wherein said positioning means consist of first means pivotably connecting said support means to said case and second means received by said support means for adjusting the relative position of said support means with regard to said case whereby the axle, extending through the aperture of said chain case, is movable therein so as to adjust the tension of said chain on said sprockets.

8. A brake mechanism as defined in claim 7 wherein said chain case is provided on the back thereof with means for receiving said second means.

9. In a lightweight vehicle, in combination:

a rotatable axle;

a driven centrifugal clutch pulley having a first plate journaled on the axle and a second plate longitudinally slidable on said axle;

a chain assembly mounted at one end of said axle and adapted to transmit driving motion to said vehicle;

a drum member rigidly secured to the outside wall of said first plate, said drum member being coaxial to said axle;

brake support means having a cylindrical housing portion coaxially mounted on said axle and arranged to allow free rotational movement of said axle therein;

a brake band having a first end connected to said brake support means and having a second end connected to brake-applying means;

said brake-applying means being mounted on said brake support means and acting on said second end of said brake band for urging the same towards the first end thereby to frictionally engage the brake band with the drum; and brake-releasing means mounted on said brake support means for urging the second end of said brake band away from said first end so as to release the brake band from its engagement with the drum member.

10. In a lightweight vehicle, in combination:

a rotatable axle;

a driven centrifugal clutch pulley mounted adjacent one end of said axle and having a first plate journaled on said axle and a second plate adapted to slide longitudinally on said axle;

a chain assembly positioned at the other end of said axle including a chain case, a chain and chain-receiving sprockets, said chain case being affixed to the chassis of said vehicle and having an aperture therethrough to receive said axle, said aperture being shaped so as to enable radial displacement of said axle therein; and brake support and chain-tensioning means coaxially mounted on said axle between said first plate and said chain assembly and including means for adjusting the relative position of said axle in said aperture of said chain case, said brake support and chain-tensioning means further including brake-applying means to frictionally engage the friction surface of a drum-engaging means with a drum member integrally and coaxially mounted on said first plate adjacent said support means, and brake-releasing means to remove said friction surface from its engagement with said drum member.